United States Patent Office

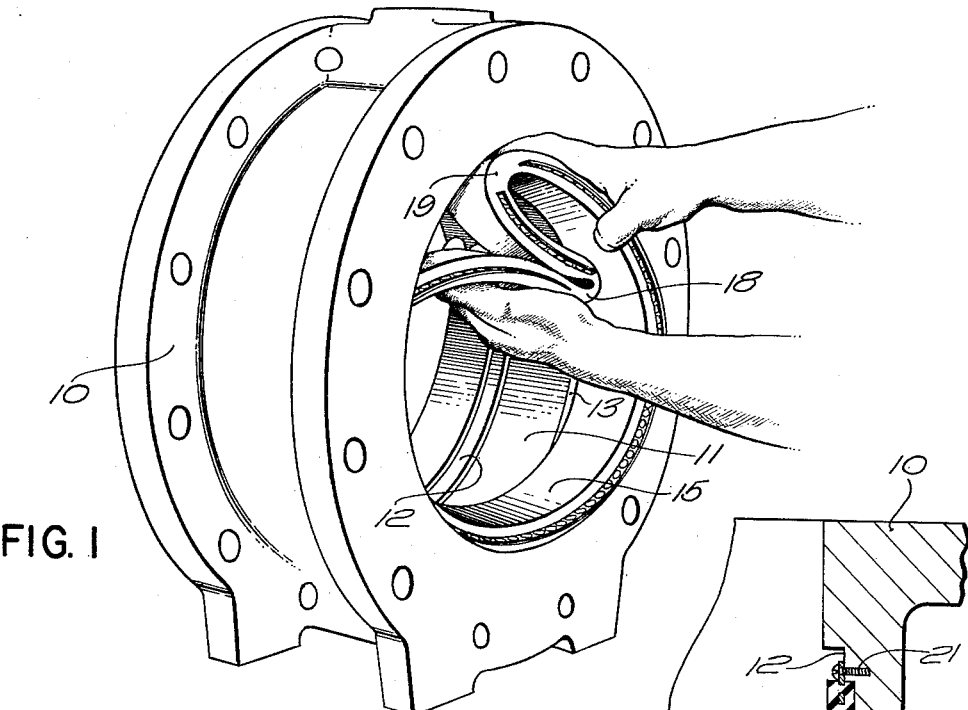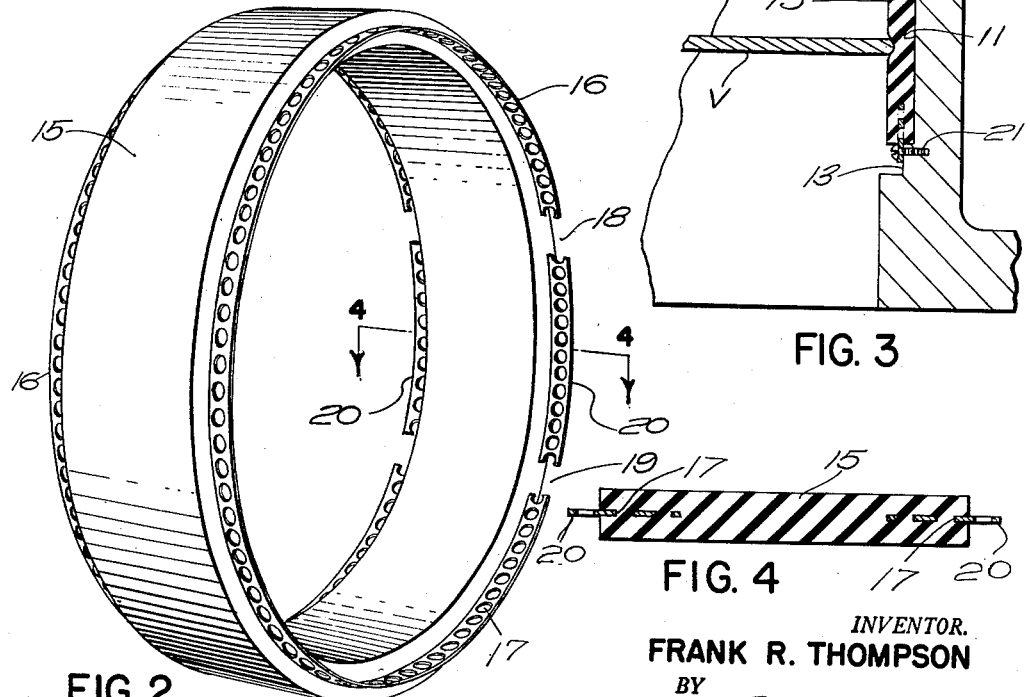

2,809,060
Patented Oct. 8, 1957

2,809,060

SEALING MEMBER

Frank R. Thompson, Cranston, R. I., assignor to B-I-F Industries, Inc., a corporation of Rhode Island Application September 9, 1955, Serial No. 533,382

2 Claims. (Cl. 288—1)

This invention relates to a valve and more particularly to a butterfly valve sealing member which may be readily inserted and removed from the valve casing.

The sealing member or seat of a butterfly type of valve consists of an annular ring generally made from some resilient type of material such as rubber or the like. This annular ring is inserted into an annular recess which has been formed of a diameter equal to the external diameter of the sealing device or seat. It is known that an annular resilient ring when inserted into a body in the manner described will exert a radial component force against the body sufficient to hold it in position against the usual removal forces. Because of this fact it will be apparent that it becomes exceedingly difficult to remove a seal or seat once it has been placed in the valve and due to wear needs to be replaced.

It is therefore one of the objects of this invention to provide a seal or seat for a valve of the butterfly type or other structure requiring an annular seal which may be readily inserted and removed from the structure.

It is a further object of the invention to provide a seal or annular seat in a form in which the body will be stiffened but will retain a resilient portion at the sealing area, which is generally in the center thereof.

A more specific object of the invention is to provide an annular sealing ring of resilient material which has embedded in the edges thereof a relatively stiff material that is broken in at least two locations to form areas of flexure.

With these and other objects in view, the invention consists of certain novel features of construction as will be more fully described and particularly pointed out in the appended claims.

In the drawings:

Figure 1 is a perspective view of a butterfly valve casing showing an annular seat being inserted therein;

Figure 2 is a perspective view of the annular seat;

Figure 3 is a partial sectional view taken along a diameter of the valve casing; and Figure 4 is a sectional view of the seal taken along lines 4—4 of Figure 2.

Referring to the drawing, 10 generally designates the body or casing of the butterfly valve. As is well known, a butterfly valve generally has disposed within this casing a valve disk V which is secured to a valve stem that is rotatable on a diameter of the valve casing. These parts have been eliminated for clarity, as they are well understood in the art. Disposed within the casing 10 is an annular recess 11 which has stepped side portions 12 and 13 and an annular seat or seal 15 adapted to fit in the annular recess 11, as more particularly shown in Figure 3. It will be noted that this annular seat 15 is provided with perforated metallic edges 16 which are embedded in the edges of the annular seal 15 at approximately the mid-center section thereof. The seals 15 are generally formed by molding, and in this molding process the metallic perforated portions 16 are molded integrally within the seal 15. It will be noted particularly by referring to Figure 4 that the perforations 17 within the seal 15 provide an area wherein the resilient material, which is generally of rubber, may enter and firmly hold the metallic portion to the resilient portion. It will additionally be noted that the metallic edge portions 16 are not formed of one continuous piece of metal.

As will be seen in Figure 2, the metallic portions 16 are broken as at 18 and 19 so as form a separate metallic portion 20 at each edge. It will be apparent that since there is no reinforcing at the portion 18 and 19, the annular seal 15 will readily form a line of flexure at these locations, which is more specifically shown in Figure 1. It will also be noted by referring to Figure 1 that the annular seal 15 has been flexed at the areas 18 and 19 to collapse the ring so as to decrease the diameter to allow insertion into the valve casing 10. It will be apparent, therefore, that the resilient member 15 which has been flexed to a smaller diameter may be readily inserted into the casing as shown in Figure 1. Once the portion diametrically opposite the flexed portions 18 and 19 has been seated within the annular recess 11, pressure may be released from the flexed portions, and the whole annular seal will spring into a circular configuration and tightly embrace the walls of the recess 11. To assure fastening of the seal within the valve body 10, screws such as 21 are provided. The screws 21 may be readily passed through the perforations in the metallic ring 16 and need only be placed at spaced locations along the circumference of the sealing member 15 to assist in holding it in position.

While I have referred to the portions 16 and 20 as being metallic, it will be apparent that while steel may be the preferred material, other materials may be substituted, even some non-metallic materials, as the prime requisite is that the relative stiffness between the seal 15 and members 16, 20 be sufficient to secure the desired action and bend with the seal.

I claim:

1. A packing adapted for use as a sealing device comprising an annular ring of resilient material, said ring having embedded therein at least two pair of axially spaced hoop shape reinforcing elements, the ends of said elements being spaced to allow the ring to be flexed in at least the areas between the spaced ends of said elements, said elements protruding axially from said ring to allow the ring to be attached in position.

2. A packing adapted for use as a sealing device comprising an annular ring of resilient material, said ring having substantially a rectangular cross-section with two oppositely disposed spaced circumferential edges, said ring having embedded in said edges hoop shaped reinforcing elements, said elements protruding axially from said edges to form attachment portions, the ends of said elements being spaced to define axial flexure areas.

References Cited in the file of this patent

UNITED STATES PATENTS

| 1,977,351 | Phillips | Oct. 16, 1934 |
| 2,024,682 | Eiseman | Dec. 17, 1935 |
| 2,710,630 | Greer | June 14, 1955 |